C. MURDOCK.
Churn.
No. 6,133.
Patented Feb. 20, 1849.
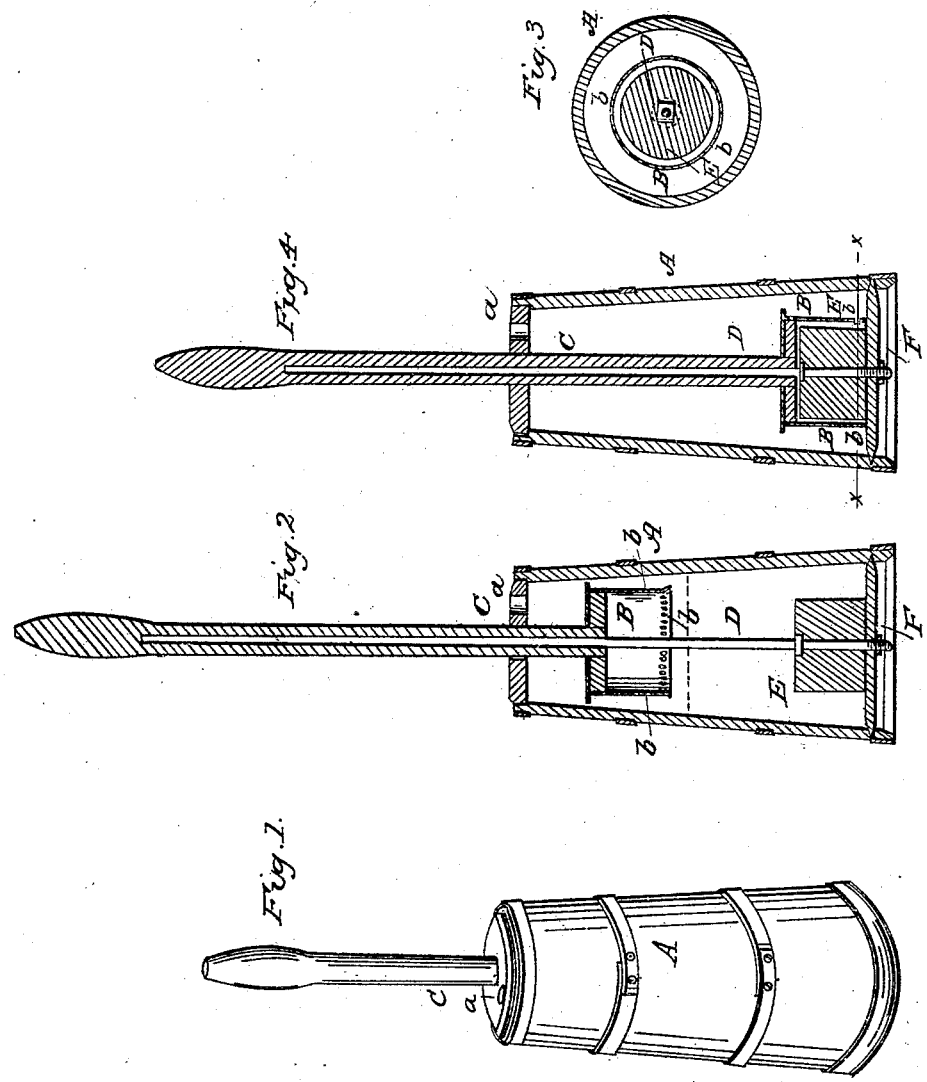

UNITED STATES PATENT OFFICE.

CHARLES MURDOCK, OF BALTIMORE, MARYLAND.

CHURN.

Specification of Letters Patent No. 6,133, dated February 20, 1849.

*To all whom it may concern:*

Be it known that I, CHARLES MURDOCK, of the city of Baltimore and State of Maryland, have invented a new and useful Improvement in Churns, called "Murdock's Atmospheric Churn," which is described as follows, reference being had to the annexed drawings of the same, making part of this specification.

Figure 1 is a perspective view of the churn. Fig. 2 is a vertical section, the cylinder dasher being raised above the cream or milk. Fig. 3 is a horizontal section, on the line $x\ x$ of Fig. 4. Fig. 4 is a vertical section—the cylinder dasher being down.

Similar letters in the several figures refer to corresponding parts.

The nature of my invention and improvement consists in combining with the ordinary dash churn A a hollow perforated cylindrical dash B secured to the lower end of the common dash staff C which staff is perforated in the center vertically to permit it to move up and down over a central vertical stationary guide spindle D fixed permanently in the center of a stationary cylindrical block E of less diameter than the hollow cylindrical dash which moves over it in its descent and ascent—said circular block E being fastened to the center of the churn tub by the aforesaid spindle D which is extended through its bottom and is secured by a nut F screwed onto the lower end of it which likewise secures the spindle in a permanent vertical position—the motion of the dash staff being similar to that of the common churn, but the effect being to fill the hollow cylinder dash at each ascending movement with atmospheric air admitted through the head of the churn tub at $a$ and to convey said air down through the cream or milk, until it is met by the central stationary block E when it is compressed in the cylinder forced radially through the apertures $b$ in the cylinder dash into the cream through which it rises to the surface thereof having become diffused throughout the milk or cream and intimately mixed with the fatty or oily particles thereof causing the same to be converted into small particles of butter which are collected and united into a mass by the reciprocatory movement of the dasher — the dasher and cylinder at each upward movement being raised above the surface of the cream to take in a fresh supply of air. The air, however, may be let into the cylinder through a valve in its top or side instead of open end which will do away with the necessity of raising the cylinder above the surface of the cream to receive air. The aperture in the staff must be a little larger than the spindle but must not extend through it nor be intersected by any lateral opening.

The cylinder dash for receiving and conveying the air through the cream may be formed in the under side of the dash block or be made by securing a cylinder to the periphery of the dash in the manner represented in the drawing.

When a stone churn tub is used the hole for the spindle may be drilled or bored in the center and may also be bushed to prevent leakage or rendered tight in any convenient way.

What I claim as my invention and desire to secure by Letters Patent, is—

The combination of the hollow cylinder dash B perforated around its periphery near its lower, or open end, with a number of small apertures for the air to pass through and the central guide spindle D, and stationary cylindrical central block E, over which the cylindrical dash works, with the ordinary upright tub churn A—the several parts being made, arranged, and operated substantially in the manner and for the purpose above set forth.

In testimony whereof I have hereunto signed my name before two witnesses this 21 of Nov. 1848.

CHARLES MURDOCK.

Witnesses:
WM. P. ELLIOT,
R. W. FENWICK.